United States Patent [19]
Delp, II

[11] Patent Number: 5,846,291
[45] Date of Patent: *Dec. 8, 1998

[54] OXYGEN ENRICHED AIR GENERATION SYSTEM

[75] Inventor: William H. Delp, II, Lake Worth, Fla.

[73] Assignee: Undersea Breathing Systems, Inc., Lake Worth, Fla.

[*] Notice: This patent issued on a continued prosecution application filed under 37 CFR 1.53(d), and is subject to the twenty year patent term provisions of 35 U.S.C. 154(a)(2).

[21] Appl. No.: 822,141

[22] Filed: Mar. 17, 1997

Related U.S. Application Data

[63] Continuation of Ser. No. 518,020, Aug. 22, 1995, Pat. No. 5,611,845.

[51] Int. Cl.⁶ .................................................... B01D 53/22
[52] U.S. Cl. .......................... 95/8; 95/12; 95/14; 95/47; 95/54; 96/4; 96/8; 96/10; 96/397; 96/408
[58] Field of Search ........................... 95/8, 12, 14, 23, 95/45, 47, 54; 96/4, 7, 8, 10, 397, 408; 55/210, 218, 267–269

[56] References Cited

U.S. PATENT DOCUMENTS

| Re. 33,502 | 12/1990 | Gollan | 95/45 |
|---|---|---|---|
| 3,369,343 | 2/1968 | Robb | 96/4 X |
| 3,593,735 | 7/1971 | Reiher | 137/88 |
| 3,727,626 | 4/1973 | Kanwisher et al. | 137/88 |
| 3,777,809 | 12/1973 | Milde, Jr. | 55/16 |
| 3,799,218 | 3/1974 | Douglass | 141/18 |
| 3,930,813 | 1/1976 | Gessner | 95/54 |
| 3,976,451 | 8/1976 | Blackmer et al. | 96/7 |
| 4,022,234 | 5/1977 | Dobritz | 137/7 |
| 4,023,587 | 5/1977 | Dobritz | 137/88 |
| 4,174,955 | 11/1979 | Blackmer et al. | 96/7 |
| 4,198,213 | 4/1980 | Mannatt | 55/16 |
| 4,230,463 | 10/1980 | Henis et al. | 55/16 |
| 4,421,529 | 12/1983 | Revak et al. | 95/54 |
| 4,537,606 | 8/1985 | Itoh et al. | 96/7 |
| 4,560,394 | 12/1985 | McDonald et al. | 95/54 |

(List continued on next page.)

FOREIGN PATENT DOCUMENTS

| 57-144020 | 9/1982 | Japan | 95/54 |
|---|---|---|---|
| 1-264905 | 10/1989 | Japan | 96/4 |
| 3-109912 | 5/1991 | Japan | 95/8 |
| 3-242304 | 10/1991 | Japan | 96/4 |
| 3-242305 | 10/1991 | Japan | 96/4 |
| 3-247502 | 11/1991 | Japan | 96/4 |
| 4-005191 | 1/1992 | Japan | 96/8 |
| 4-122414 | 4/1992 | Japan | 95/52 |
| WO94/26394 | 11/1994 | WIPO | 95/45 |

OTHER PUBLICATIONS

"Gas Separation Technology and Undersea Habitat Mixed Gas Diving," J. Morgan Wells et al., MTS 94 Conference Proceedings, Wash., D.C., Sep. 7–9, 1994, pp. 496–502.

"Applications of Gas Separation Technology in the Preparation of Diver's Breathing Gases and Hyperbaric Atmospheres", by J. Morgan Wells et al., NOAA Experimental Diving Unit Report 93-04, Sep. 1993.

(List continued on next page.)

*Primary Examiner*—Robert Spitzer
*Attorney, Agent, or Firm*—Evenson, McKeown, Edwards & Lenahan, PLLC

[57] ABSTRACT

A system for generating oxygen enriched air includes a compressed air supply for supplying compressed air and a permeable membrane gas separation system for separating a nitrogen gas component and an oxygen enriched air component from the compressed air. An oxygen analyzer is provided to detect an oxygen concentration in the oxygen enriched air component. The nitrogen gas component is divided, by a vortex tube, into a cold gas stream and a hot gas stream, and solenoid valves are actuated to modify a flow path of the compressed air through the cold gas stream and the hot gas stream in order to selectively heat and cool the compressed air. The oxygen enriched air is then selectively distributed for further use.

17 Claims, 1 Drawing Sheet

U.S. PATENT DOCUMENTS

| | | |
|---|---|---|
| 4,632,677 | 12/1986 | Blackmer .................................. 55/158 |
| 4,681,602 | 7/1987 | Glenn et al. ............................... 95/47 |
| 4,695,295 | 9/1987 | Dorman et al. ............................ 55/16 |
| 4,758,251 | 7/1988 | Swedo et al. .............................. 55/16 |
| 4,789,388 | 12/1988 | Nishibata et al. ........................... 96/7 |
| 4,834,779 | 5/1989 | Paganessi et al. ........................ 55/16 |
| 4,849,174 | 7/1989 | Brandt et al. ............................. 422/62 |
| 4,860,803 | 8/1989 | Wells ......................................... 141/9 |
| 4,894,068 | 1/1990 | Rice ........................................... 55/16 |
| 4,950,315 | 8/1990 | Gollan ......................................... 96/7 |
| 5,053,058 | 10/1991 | Mitariten ..................................... 95/8 |
| 5,061,377 | 10/1991 | Lee et al. ................................ 210/752 |
| 5,069,692 | 12/1991 | Grennan et al. ............................ 96/4 |
| 5,120,329 | 6/1992 | Sauer et al. . |
| 5,125,937 | 6/1992 | Sadkowski et al. ...................... 55/158 |
| 5,129,921 | 7/1992 | Baker et al. ............................... 95/45 |
| 5,129,924 | 7/1992 | Schultz ................................... 95/47 X |
| 5,157,957 | 10/1992 | Mettes et al. ............................ 73/1 G |
| 5,158,584 | 10/1992 | Tamura .................................. 95/54 X |
| 5,169,415 | 12/1992 | Roettger et al. ........................... 55/68 |
| 5,226,931 | 7/1993 | Combier ...................................... 55/16 |
| 5,239,856 | 8/1993 | Mettes et al. ............................ 73/1 G |
| 5,266,101 | 11/1993 | Barbe et al. ................................ 95/23 |
| 5,284,506 | 2/1994 | Barbe ......................................... 95/23 |
| 5,302,258 | 4/1994 | Renlund et al. ......................... 204/129 |
| 5,306,331 | 4/1994 | Auvil et al. ............................. 95/45 X |
| 5,324,478 | 6/1994 | Mermoud et al. ........................ 422/62 |
| 5,332,547 | 7/1994 | Olson et al. ................................ 422/3 |
| 5,355,781 | 10/1994 | Liston et al. ............................. 99/476 |
| 5,388,413 | 2/1995 | Major et al. . |
| 5,427,160 | 6/1995 | Carson et al. .............................. 141/4 |
| 5,437,837 | 8/1995 | Olson et al. ................................ 422/3 |
| 5,439,507 | 8/1995 | Barbe et al. ................................ 95/23 |
| 5,470,379 | 11/1995 | Garrett ................................... 95/12 X |
| 5,507,855 | 4/1996 | Barry ......................................... 95/12 |
| 5,611,845 | 3/1997 | Delp, II ....................................... 96/4 |
| 5,649,995 | 7/1997 | Gast, Jr. . |
| 5,700,310 | 12/1997 | Bowman et al. . |

OTHER PUBLICATIONS

R.W. Hamilton, "Evaluating Enriched Air (Nitrox) Diving Technology", Scuber Diving Resource Group, Boulder, Colorado, Jan. 31, 1992, pp. 1–20.

D. Rutkowski, "Introduction to Nitrox", Hyperbasics Intenational, Inc. Key Logo Florida, 1992, pp. 1–50.

Michael Garms, United Kingdom patent application No. 9315694.1, filed Aug. 4, 1993.

Pamphlet titled "PRISM Alpha Membrane Separators—For Low–Cost On–Site Nitrogen", Permea Inc./A Monsato Company, 1987, pp. 1–8.

"Air Separations Via Membranes—Beyond Nitrogen", Earl R. Beaver et al., The 1990 Membrane Technology/Planning Conference, Newton, MA, Oct. 15–17, 1990.

"Application Driven Membrane Separator Designs", Donald J. Stookey et al., American Institute of Chemical Engineers, Symposium for Membrane Separation for Gas Processing Houston, TX, Apr. 9, 1991.

"Nitrox Machines", Pierce Hoover, Sport Diver Magazine, p. 74, May–Jun. 1995.

Pp. 1, 3 and 13, IANTD Journal, vol. 95–2, May–Jul. 1995, including: von Ondarza and Garcia, "Nitrox Debuts in Puerto Rico!" and Rutkowski, Gas Separation Technology?.

Pp. 1, 2, 6 and rear, IANTD Journal, vol. 94–1, Feb. –Apr. 1994, including: Mount, "Presidents Message", Gilliam, There He Goes Again . . . , and Rutkowski, Is Nitrox 'Oxygen Enriched Air' or 'Denitrogenated Air'.

Pp. 3 and 12, IANTD Journal, vol. 94–2, Rutkowski, "History of Gas Blending and Separation Technology".

Exair Corporation, "Case Histories—Vortex Tube", pp. 7–10.

Exair Corporation, Cabinet Coolers, pp. 11–17.

"Alternative Methods of Cooling and Dehumidfying Hyperbaric Systems" Linda Moroz et al., NOAA Experimental Diving Unit Report 93–05, MTS '93 Conference Proceedings, Long Beach, CA, Sep. 22–24, 1993.

"Turning up the Pressure in the Gas Blending Wars", Aqua CORPS Journal 13, n.d., p. 83.

Brochure, PRISM Separators "Nitrogen Generators", pp. 1–8, Monsanto Company, 1985.

Brochure, PRISM "Nitrogen Systems", p. 1–8, Permea, Inc., 1987.

Brochure, "PRISM Controlled Atmosphere Systems", Permea, Inc., 1987, pp. 1–4.

Brochure, Permea Offshore Nitrogen Systems, Permea Maritime Protection, 1992, 1–4.

Brochure, Permea Shipboard Gas Generation Systems, Permea A/S–Maritime Protection, 1990, pp. 1–8.

Brochure, "Advanced PRISM Membrane Systems for Cost effective Gas Separations", n.d.

"Medal Gas–separation Membranes", MEDAL, Newport, DE, Jul. 1992, pp. 1–6.

Brochure "AVIR Oxygen Enrichment Systems," A/G Technology Corporation, Needham, MA, Aug. 1989, 2 pp.

Brochure, "AG Series Gas Boosters Rapid Reference Performance Data", Haskel Inc., Burbank CA, Jun. 1986.

U.S. Navy Diving Manual, Chapter Two, Underwater Physics, pp. 2–1 –2–28, n.d.

Permea 2–page document, "How Membranes Work", 1992.

Medal 4241 Permeator Preliminary Product Specifications, 1 p.

Air Liquide M500 Operating Instructions, 9 pp., Sep. 21, 1994, w/attachment, Medal Rev. 2.0, Jul. 1992.

Copies of pp. 1–2, Judgement, and pp. 1–72, Memorandum Opinion and Order, Civil Action No. 97 C 2014, U.S. District Court for the Northern District of Illinois, Eastern Division, decided November 20, 1997.

Medal M500 Series N2 Generator, Piping and Instrumentation Diagram, Feb. 1994.

Copies of pp. 142, 164–175 and 230 233–234 from Transcripts of Proceedings—Trial Before the Hon. Morton Denlow, Magistrate Judge, Civil Action No. 97 C 2014, U.S. District Court, Northern District of Illinois, decided Nov. 20, 1997.

Miscellaneous Permea product labels and schematic diagram.

Condensed Transcript and Index of Desposition of Gregory L. Malcolm, Civil Action No. 97 C 2014, Jun. 2, 1997, pp. 65–72.

Copy of letter dated Jan. 6, 1997 from Gregory L. Malcolm, Market Manager, PERMEA, to William H. Delp.

Transcript (pp. 1–156) and Index (pp. 1–14) of Deposition of Gregory L. Malcolm taken in connection with Civil Action No. 97–C–2014 on Jun. 2, 1997, together with Deposition Exhibit Nos. 1–5 and 7–10.

"Nitrox Diving Within NOAA: History, Applications, and Future", J. Morgan Wells et al., Workshop on Enriched Air Nitrox Diving, Sep. 1989, pp. 31–41.

Copies of pp. 1–13, Plaintiff's Response to Defendent's Requests for Admissions with Exhibit A, B, C and D, and pp. 1–3, Plaintiff's Response to Defendent's Second Set of Request for Admissions with Exhibits A, B and C, Civil Action No. 97 C 2014, decided Nov. 20, 1997.

Copies of pp. 1–13, Plaintiff's Response to Defendent's First Set of Interrogatories, Civil Action No. 97 C 2014, decided Nov. 20, 1997.

OXYGEN ENRICHED AIR GENERATION SYSTEM

This is a continuation of application Ser. No. 08/518,020, filed Aug. 22, 1995, now U.S. Pat. No. 5,611,845.

BACKGROUND OF THE INVENTION

1. Field of the Invention

The present invention relates to a particular type of oxygen enriched air generation system. A permeable membrane oxygen enriched air and nitrogen gas separation device is utilized. Although the system is particularly suitable for use by dive shops for filling scuba tanks or other types of oxygen enriched air storage vessels, applications in areas such as firefighting, climbing, flight, veterinary, medical and dental treatments, welding, etc., are apparent.

2. Description of Related Art

One known system for producing a mixture of oxygen enriched air and ambient air is disclosed in U.S. Pat. No. 4,860,803 to Wells. In this system, oxygen is injected into a stream of ambient air in order to produce an oxygen enriched air mixture. The mixture is compressed and delivered to storage or scuba cylinders for use in diving or other applications. According to this system, however, a source of oxygen appropriate for injection into the ambient air stream is needed and, therefore, a great deal of caution is required, during generation of the oxygen enriched air mixture, to avoid explosions and other problems typically associated with the use of oxygen.

SUMMARY OF THE INVENTION

It is one object of this invention to provide a suitable alternative system for generating an oxygen enriched air mixture, suitable for breathing purposes, which does not require the use of oxygen supplied from a separate oxygen source.

It is another object of this invention to provide a system which generates a gas stream which may be used by a suitable element, such as a vortex tube, to adjust the oxygen concentration of the oxygen enriched air mixture.

It is a further object of this invention to divert some of the gas stream produced so that the portion of the gas stream diverted may be used for inerting purposes such as, for example, to inert the crankcase of a compressor so that the compressor may be a standard oil-lubricated compressor rather than an oil-free compressor.

According to the present invention, these and other objects are accomplished by the provision of a system for generating oxygen enriched air which includes a compressed air supply for supplying compressed air and a permeable membrane gas separation system for separating a nitrogen gas component and an oxygen enriched air component from the compressed air. An oxygen analyzer is provided to detect an oxygen concentration in the oxygen enriched air component. The nitrogen gas component is divided, by a vortex tube, into a cold gas stream and a hot gas stream, and solenoid valves are actuated to modify a flow path of the compressed air through the cold gas stream and the hot gas stream in order to selectively heat and cool the compressed air. The oxygen enriched air is then selectively distributed for further use. A compressed oxygen enriched air storage assembly, a compressor, a compressor feed line supplying the oxygen enriched air component to a compressor inlet and an outlet line interconnecting a compressor outlet to the compressed oxygen enriched air storage assembly are provided.

The solenoid valves are used to modify the flow path of the compressed air by alternate opening and closing thereof so that the compressed air is selectively heated and cooled by the gas streams to adjust the oxygen concentration of the oxygen enriched air component to a desired oxygen concentration. An ambient air feed line admits ambient air into the compressor feed line so as to mix with the oxygen enriched air component. A regulating valve is used to regulate the amount of ambient air admitted into the compressor feed line and also permits adjustment of the oxygen concentration.

The oxygen analyzer is interconnected with the outlet line to permit monitoring of the oxygen concentration of a mixture of ambient air and the oxygen enriched air component in the outlet line. The system includes an oxygen enriched air supply line and at least one valve provided in the oxygen enriched air supply line to regulate flow of the mixture into appropriate containers for storing the mixture. The oxygen analyzer, or another oxygen analyzer, is also interconnected with an outlet of the permeable membrane gas separation system to permit monitoring of the oxygen concentration of the oxygen enriched air component passing through the outlet. A valve is used to selectively eliminate admission of the oxygen enriched air component into the compressor feed line so that only ambient air passes through the outlet line and the air supply can be recharged. Finally, a branch line for diverting some of the nitrogen gas component to a crankcase of the compressor, in order to reduce any possibility of explosion, is provided.

DESCRIPTION OF THE PREFERRED EMBODIMENT

Figure 1:
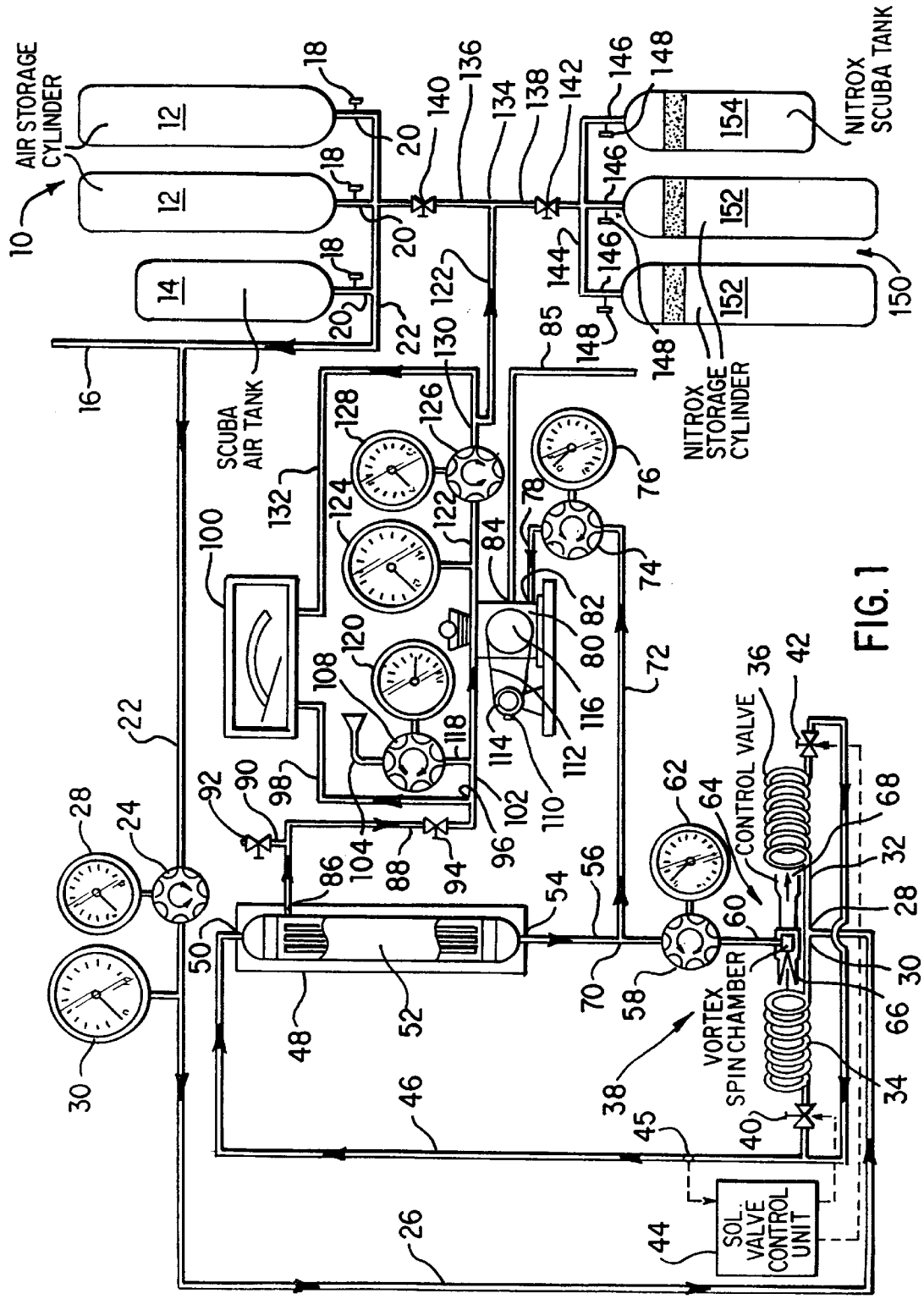
FIG. 1, the only drawing figure provided, illustrates the overall structure of an oxygen enriched air generation system according to the invention.

A compressed air supply is provided by an assembly 10 of one or more storage vessels. Such storage vessels may include one or more conventional, removable, compressed air storage cylinders 12. Other sources of compressed air, such as a known, oil-free, high pressure compressor (not shown) connected to an alternative compressed air supply branch line 16, may be provided if desired. If a compressor is not attached to the branch line 16, then the branch line 16 may be capped.

A flow control valve 18 is provided in each branch line 20 connecting an air storage cylinder 12 to a high pressure feed air line 22. A self-contained underwater breathing apparatus (scuba) air tank 14 may also be removably connected to the high pressure feed air line 22, also by a branch line 20 having a flow control valve 18 therein, for reasons which will become apparent. The compressed air is stored in the storage vessels at an initial pressure of anywhere in the range of 3000–6000 p.s.i.g. and, therefore, supplied to the high pressure feed air line 22 at such a pressure. Air flow through the line 22, and air or gas flow through each of the other lines shown in the drawing figure, occurs in the directions indicated by arrows.

The high pressure air feed line 22 leads from each of the branch lines 16 and 20 to a conventional pressure regulator controlled, by operation of a rotatable knob 24, so as to reduce the pressure of the air supplied by the feed line 22. The pressure regulator is used to reduce the pressure of the compressed air passing into the low pressure feed air line 26 so that it is lower than approximately 600 p.s.i.g. and, typically, in the range of 50–250 p.s.i.g. Air pressure in the low pressure feed air line 26 is monitored by a low pressure side pressure gauge 28 which indicates the air pressure, in p.s.i.g., for example, in the line 26. A flow meter 30 is used to monitor the rate of air flow in the low pressure feed air line 26 and indicates the air flow rate in standard cubic feet per minute (SCFM), for example.

The low pressure feed air line 26 leads to a junction 28 from which a pair of heat exchanger lines 30 and 32 branch off. A portion of the line 30 defines a first coil 34, while a portion of the line 32 defines a second coil 36. As will become clear, the first coil 34 defines a cold coil of a heating and cooling heat exchanger, generally designated 38, while the second coil 36 defines a hot coil of the heat exchanger 38.

At the outlet of the first coil 34, a first thermostatically operated ON-OFF solenoid valve 40 is disposed. A second thermostatically operated ON-OFF solenoid valve 42 is similarly disposed at the outlet of the second coil 36. Each of the solenoid valves 40 and 42 is conventional in construction and is alternatively energized and de-energized by a conventional thermostatically operated control unit 44. Input may be provided to the control unit 44, for example, by a temperature sensor 45 or a plurality of such sensors. The control unit, otherwise, could be manually adjusted based on temperature readings obtained from an appropriately located thermometer, if desired. The solenoid valves are controlled by the unit 44 so that when the valve 40 is open to permit compressed air flow through the line 30 and the first coil 34, the valve 42 is closed to prevent compressed air flow through the line 32 and the second coil 36 and when the valve 42 is open to permit compressed air flow through the line 32 and the second coil 36, the valve 40 is closed to prevent compressed air flow through the line 30 and the first coil 34. Alternate opening and closing, i.e. "cycling", of the solenoid valves at variable cycling or oscillation periods is permitted by the control unit 44. Consequently, if more compressed air is to pass through the first coil 34 than through the second coil 36, then, for every on-off cycle period, the first solenoid valve 40 is controlled by the unit 44 so that it is open for a longer time than the second solenoid valve 42. If more compressed air is to pass through the second coil 36 than through the first coil 34, then, for every on-off cycle period, the second solenoid valve 42 is controlled by the unit 44 so that it is open for a longer time than the first solenoid valve 40. If the same amount of compressed air is to pass through the coils 34 and 36, then the solenoid valves 40 and 42 are opened for equal times. Finally, if compressed air is to flow only through the first coil 34, then only the valve 40 is opened by the control unit, while if compressed air is to flow only through the second coil 36, then only the valve 42 is opened; no valve cycling or oscillating occurs in these particular situations. The solenoid valves 40 and 42, therefore, form flow modifying means for modifying a flow path of the compressed air.

Compressed low pressure feed air exits the heat exchanger 38 through a supply line 46. The supply line 46 passes the compressed low pressure feed air to a compressed air inlet port 50 of a standard, known, commercially available, permeable membrane, oxygen enriched air (NITROX) and nitrogen gas separation system 48; such a gas separation system 48 is preferably of the type using a membrane cartridge 52 and is readily available from any of a number of companies. U.S. Pat. Nos. 4,894,068 and 5,226,931 describe such separation systems. The knob 24 is used to control the pressure of the air in the low pressure feed air line 26 so that this pressure and the corresponding rate of air flow are appropriate for, and meet the specifications of, the particular gas separation system 48 ultimately selected. Typical pressures are in the 50–250 p.s.i.g. range as mentioned previously.

A nitrogen gas ($N_2$) component separated from the compressed low pressure feed air supplied through the port 50 passes from the system 48 through an exit port 54 and into a $N_2$ carrying line 56. The $N_2$ carried by the line 56 primarily passes to a conventional pressure regulator controlled, by operation of a rotatable knob 58, so that the pressure of the $N_2$ is reduced before entering compressed gas supply line 60 of the heat exchanger 38. The pressure of the $N_2$ is monitored by a $N_2$ supply line pressure gauge 62 and dropped by the regulator so that it is somewhere in the range of approximately 80–100 p.s.i.g. and appropriate for supply to the spin chamber of a known and commercially available vortex tube 64 which forms another part of the heat exchanger 38. Vortex tubes of this type are available from EXAIR corporation of Cincinnati, Ohio, for example. The vortex tube 64 operates to divide the nitrogen gas component into a cold nitrogen gas stream and a hot nitrogen gas stream. More specifically, cold $N_2$ leaves the vortex tube 64 through a cold gas exhaust 66, which is directed towards the first coil 34, while hot $N_2$ leaves the vortex tube 64 through a hot gas exhaust 68, which is directed towards the second coil 36. In this manner, heat is supplied to the compressed air which is directed through the heat exchanger line 32 and the second coil 36, while heat is taken away from the compressed air which is directed through the heat exchanger line 30 and the first coil 34. Appropriate operation of the solenoid valves 40 and 42 by the control unit 44 permits selective heating and cooling, i.e. "temperature conditioning", of the compressed low pressure feed air passing through the heat exchanger 38 and the supply line 46 so that the temperature is appropriate for, and meets the specifications of, the particular separation system 48 selected.

After the $N_2$ has been used in the heat exchanger 38 for heating or cooling, it may be collected and stored for other uses if desired. Otherwise, the $N_2$ may be exhausted to the atmosphere as waste gas.

Some of the $N_2$ carried by the line 56 is diverted, at a junction 70, through a branch line 72. The branch line 72 leads to a conventional pressure regulator, controlled by a knob 74, which reduces the pressure of the $N_2$ monitored by a pressure gage 76 and passing into a compressor crankcase supply line 78 to somewhere in the range of approximately 1–3 p.s.i.g. Flow rates of the $N_2$ through the supply line 78 are about 1–3 liters per minute, which amount to approximately 1%, or less, of the $N_2$ leaving the exit port 54 of the system 48. The supply line 78 feeds into a standard crankcase vent 82, which otherwise would be open to the atmosphere, of a standard, oil-lubricated, high pressure compressor 80. Operation of the compressor 80 is described later. The $N_2$ supplied by the line 78 passes through the crankcase and exits through an exhaust port 84, provided in the crankcase, into a crankcase exhaust line 85 leading to the atmosphere. In this manner, the crankcase of the compressor 80 is inerted by the $N_2$ supplied in order to reduce any possibility of explosion. This permits the use of the standard, oil-lubricated compressor 80 rather than an oil-free compressor.

A directly breathable, oxygen enriched air (NITROX) component separated from the compressed low pressure feed air supplied through the port 50 passes from the separation system 48 through an oxygen enriched air exhaust port 86 and into a low pressure oxygen enriched air feed line 88. The oxygen enriched air passing through the port 86 is a breathable mixture which may be supplied for direct inhalation. Accordingly, an optional branch line 90, leading from the feed line 88, may be provided. The oxygen enriched air can be diverted through the line 90 for any of a variety of non-diving applications. Pressure in the feed line 88 is typically quite low, i.e. in the 0.5–5 p.s.i.g. range. A conventional flow control valve 92 may be used to open and close off the optional branch line 90. A conventional flow control valve 94 is also disposed in the feed line 88 so that the flow of oxygen enriched air through the feed line 88 can be permitted, shut off and regulated.

A small amount of the oxygen enriched air component flowing through the low pressure feed line 88 is diverted, at junction 96, through a sampling line 98. The sampling line 98 leads to a conventional oxygen analyzer 100 which detects and provides a reading of the oxygen concentration of the oxygen enriched air passing through the flow control valve 94 and into a compressor feed line 102 leading to the oil-lubricated, high pressure compressor 80. The analyzer shown can provide oxygen concentration readings anywhere in the range of 0% to 50%. The temperature of the compressed low pressure feed air in the supply line 46 influences the oxygen concentration of the oxygen enriched air passing from the system 48. Appropriate cycling of the solenoid valves 40 and 42, therefore, can be used to selectively heat and cool the feed air in the supply line and adjust this oxygen concentration. As is usual, the compressor 80 is operated by an electric or gasoline powered motor 110 interconnected with the compressor 80 by a belt 112 and pulleys 114 and 116.

An ambient air intake 104 leads to a conventional ambient air flow or pressure regulation valve controlled, by operation of a rotatable knob 108, so as to modify the flow and pressure of ambient air admitted into the compressor feed line 102 through an ambient air feed line 118. A pressure gauge 120 can be used to indicate the pressure in the feed line 118 which varies depending on the degree, between 0% and 100%, to which the air flow or pressure regulation valve is opened; as shown, the gauge 120 provides readings which could vary between –15 p.s.i.g. (partial vacuum) and 30 p.s.i.g.

Oxygen enriched air (NITROX) only, ambient air only, or a combination of oxygen enriched air and ambient air may be drawn through the compressor feed line 102 to a compressor inlet when the compressor 80 is operated; typically, a mixture of the oxygen enriched air and the ambient air is drawn into the compressor. Compressed oxygen enriched air, compressed ambient air or a compressed combination of oxygen enriched air and ambient air subsequently passes through a compressor outlet and into a high pressure side outlet line 122. A conventional flow meter 124 is used to monitor the rate of air flow through the line 122 and indicates such an air flow rate in SCFM. As shown, readings of 0–60 SCFM could be provided by the flow meter 124. The air pressure in the outlet line 122 is adjusted by a conventional pressure regulator, operated by a rotatable knob 126, to an appropriate pressure. The air pressure in the outlet line 122 is monitored by a pressure gauge 128 which is conventional in structure. The high pressure side air pressure is typically between 3000 and 6000 p.s.i.g. In the embodiment of the invention illustrated, keeping the high pressure side air pressure below 4000 p.s.i.g. is appropriate because of the capability of the pressure gauge 128.

At a junction 130, a high pressure side sampling line 132 diverts a small portion of the compressed oxygen enriched air, the compressed ambient air or the compressed combination thereof from the outlet line 122 to the analyzer 100 (or a completely separate and different oxygen analyzer if desired). A reading of the oxygen concentration of the air passing through the line 122, be it oxygen enriched, ambient or a combination of oxygen enriched and ambient, is thereby provided.

Air which has been compressed by the compressor 80 passes through the outlet line 122 to a junction 134 at which point the outlet line is divided into a first or ambient air supply line 136 and a second or oxygen enriched air supply line 138. A conventional flow regulating valve 140 is disposed in the line 136 to regulate the flow of ambient air therethrough, while a conventional flow regulating valve 142 is disposed in the line 138 to regulate the flow of oxygen enriched air therethrough. As is clear from the drawing figure, the air supply line 136 feeds into the high pressure feed air line 22. As a result, the air supply line 136 is able to supply compressed air to the line 22 and to each of the branch lines 20. Similarly, the oxygen enriched air supply line 138 feeds into a high pressure feed oxygen enriched air line 144 and any desired number of branch lines 146 associated therewith. Each branch line 146 includes a flow control valve 148, similar to the valves 18, to regulate the flow of oxygen enriched air into a compressed oxygen enriched air storage assembly 150 including one or more conventional and appropriately labeled NITROX storage vessels such as removable storage cylinders 152 or a removable NITROX scuba tank 154. Both assembly 10 and assembly 150 may be located either above water or under water. Applications other than for diving purposes, such as in firefighting, climbing, space or high altitude flight, veterinary, medical and dental treatments, welding, etc., are apparent.

A variety of operations can be performed by the system represented in FIG. 1. To provide an initial charge or a recharge to an air storage cylinder 12, or a plurality of such cylinders, or to charge a scuba air tank 14, the appropriate flow control valve or valves 18 is or are opened. The flow regulating valve 140 is opened while the flow regulating valve 142 is closed. The flow control valve 94 is closed to eliminate the admission or flow of oxygen enriched air into the feed line 102. The knob 108 is rotated to permit free flow of ambient air through the intake 104 and into the compressor feed line 102. The motor 110 is turned on to drive the compressor 80 and draw ambient air into the feed line 102. The air is compressed and then passed through the outlet line 122, the air supply line 136 and the appropriate branch line or lines 20 and into the appropriate air storage cylinder or cylinders 12 and/or scuba air tank or tanks 14.

To provide an initial charge, or a recharge, to a NITROX storage cylinder 152, or a plurality of such cylinders, or to charge a NITROX scuba tank 154, the flow regulating valve 140 is closed, while the flow regulating valve 142 is opened. If it is provided, then the flow control valve 92 is closed. The flow control valve 94 is opened to permit free flow of oxygen enriched air into the feed line 102. The knob 108 may be rotated to cause the valve associated therewith to set the flow rate of ambient air through the intake 104 and into the feed line 102 to an initial value. The motor 110 is turned on to drive the compressor 80 and draw a mixture of both ambient and oxygen enriched air into the feed line 102. The air mixture is compressed and then passed through the outlet line 122, the oxygen enriched air supply line 138 and one or more of the branch lines 146. At this point, one or more of the branch lines 146 may be left open. The oxygen concentration of the ambient and compressed oxygen enriched air mixture passing through the outlet line 122 is detected by the oxygen analyzer 100 and, as a result, may be closely monitored during any oxygen concentration adjustment.

It has been found that various parameters influence the concentration of oxygen in the compressed oxygen enriched air passing through the outlet line 122. These parameters include, for example, the temperature of the feed air in the supply line 46 mentioned previously, the pressure of the air in the low pressure feed air line 26 and, of course, the rate at which ambient air is admitted into the compressor feed line 102 through the ambient air intake 104. The concentration of oxygen in the compressed oxygen enriched air passing through the high pressure outlet line 122, therefore, can be modified to any desired concentration by adjustment of these parameters. Such an adjustment may be made by changing the setting of the pressure regulator knob 24, the setting of the thermostatic control of the unit 44, the setting of the air pressure regulation valve knob 108 or the settings of two or more of these elements. For diving applications, typically desired oxygen concentrations are 32% oxygen (NOAA NITROX I) and 36% oxygen (NOAA NITROX II). The parameters obviously could be adjusted so that other concentrations of oxygen in the compressed air passing through the outlet line 122 are provided.

Once a suitable oxygen concentration adjustment of the compressed oxygen enriched air and ambient air mixture in the outlet line 122 has been performed, the appropriate NITROX storage cylinders 152 or NITROX scuba tanks 154 may be connected to the branch lines 146. The flow control valves 148 may then be operated to admit the oxygen enriched air and ambient air mixture into the NITROX storage cylinders 152 and/or the NITROX scuba tanks 154. Appropriate pressure regulation is provided by the knob 126 and the pressure gauge 128.

If a diversion of oxygen enriched air through the optional branch line 90 is desired, then the flow control valve 92 is opened. The oxygen enriched air leaving the separation system 48 through the port 86 is then permitted to pass through the optional branch line 90 so that it may be used in any of a variety of non-diving applications. This oxygen enriched air is directly breathable. As mentioned previously, the pressure in the feed line 88 is usually quite low (in the 0.5 to 5 p.s.i.g. range) and, as a result, the flow of air through the branch line 90 occurs at a fairly low rate. The flow control valve 94 may be left open so that some of the air passing through the port 86 is also permitted to enter the sampling line 98 and, therefore, pass to the oxygen analyzer 100. In this manner, the oxygen concentration of the oxygen enriched air exiting through the port 86 and flowing through the branch line 90 can be monitored. Thus, the flow control valve 92 and the flow regulating valves 140 and 142, together with the other elements used to properly route the oxygen enriched air passing through the port 86, form means for selectively distributing the oxygen enriched air component for further use.

Variations in the embodiment described above and represented in the drawing figure may occur to these skilled in the art. It is intended to protect any such variations which do not depart from the spirit of this invention by the following claims.

What is claimed is:

1. Method for generating high pressure oxygen enriched air having a predetermined oxygen content comprising the steps of:
   a) providing a high pressure gas stream of air containing nitrogen and oxygen;
   b) reducing the pressure of the gas stream, with cooling, to below 600 p.s.i.g.;
   c) adjusting a temperature of the reduced pressure gas stream to a preselected value;
   d) introducing the pressure reduced, temperature adjusted gas stream into an inlet of a separation chamber containing a permeable nitrogen-oxygen separation membrane system and having two outlets, one outlet on an inlet side of the membrane system and another outlet on an opposite side of the membrane system;
   e) withdrawing a first gas stream containing substantially nitrogen from the one outlet of the separation chamber;
   f) withdrawing a second gas stream containing oxygen enriched air at a pressure from 0.5 to 5 p.s.i.g. from the other outlet of the separation chamber;
   g) monitoring the oxygen content of the second gas stream;
   h) controlling operating conditions of the separation chamber to obtain the second gas stream having the predetermined oxygen content; and
   i) compressing the second gas stream to a high pressure.

2. Method according to claim 1, including the further step of storing the high pressure second gas stream.

3. Method according to claim 1, wherein the predetermined oxygen content of the second gas stream is about 32%.

4. Method according to claim 1, wherein the predetermined oxygen content of the second gas stream is about 36%.

5. Method according to claim 1, wherein the high pressure gas stream of air is under a pressure of 3000–6000 p.s.i.g.

6. Method according to claim 1, wherein the step of reducing the pressure of the gas stream reduces the pressure to from about 50 to about 250 p.s.i.g.

7. Method according to claim 1, including the further step of filling a scuba diving tank with the high pressure second gas stream.

8. A system for generating oxygen enriched air having a predetermined oxygen content comprising:
   an air supply for supplying high pressure compressed air;
   a pressure regulator for selectively reducing the pressure of the compressed air to below 600 p.s.i.g. and cooling the pressure reduced air;
   a heat exchanger for adjusting the temperature of the pressure reduced air;
   a permeable membrane gas separation system for separating nitrogen from temperature adjusted pressure reduced air having an inlet for temperature adjusted pressure reduced air and two outlets, one for nitrogen and the other for oxygen enriched air;
   a device for detecting oxygen concentration in said oxygen enriched air;
   a controller for controlling operation of said permeable membrane gas separation system so that the oxygen enriched air separated in the separation system has the predetermined oxygen content;
   a compressor for compressing the oxygen enriched air to a high pressure; and
   a distribution arrangement for selectively distributing the high pressure oxygen enriched air for further use.

9. A system as defined in claim 8, further comprising a compressed oxygen enriched air storage assembly, a compressor feed line supplying said oxygen enriched air to a compressor inlet and an outlet line interconnecting a compressor outlet to said compressed oxygen enriched air storage assembly.

10. A system as defined in claim 9, further comprising an ambient air feed line for admitting ambient air into said compressor feed line to mix with said oxygen enriched air and a regulator for regulating the amount of ambient air admitted into said compressor feed line to permit adjustment of said oxygen concentration.

11. A system as defined in claim 10, further comprising a valve for selectively eliminating admission of said oxygen enriched air into said compressor feed line so that only ambient air passes through said outlet line and said air supply can be recharged.

12. A system as defined in claim 9, wherein said device for detecting the oxygen concentration is interconnected with said compressor feed line.

13. A system as defined in claim 9, wherein said distribution arrangement for selectively distributing said high pressure oxygen enriched air for further use comprises an oxygen enriched air supply line and at least one valve provided in said oxygen enriched air supply line to regulate flow into the storage assembly.

14. A system as defined in claim 9, further comprising an ambient air feed line for admitting ambient air into said compressor inlet to be compressed and a high pressure air line connecting the outlet of said compressor to said air supply.

15. A system as defined in claim 8, wherein said device for detecting oxygen concentration is located in the vicinity of the outlet of said permeable membrane gas separation system for the oxygen enriched air for monitoring of the oxygen concentration of said oxygen enriched air passing through said outlet.

16. A system as defined in claim 8, wherein said device for detecting the oxygen concentration is located at the other outlet of said permeable membrane gas separation system to monitor the oxygen concentration of said oxygen enriched air passing through said other outlet.

17. A system as defined in claim 8, further comprising a thermostat for monitoring the temperature of the temperature adjusted pressure reduced air and for controlling the heat exchanger in response thereto.

* * * * *